United States Patent
Halladay et al.

(10) Patent No.: US 6,816,957 B1
(45) Date of Patent: Nov. 9, 2004

(54) MANAGEMENT OF VIRTUAL TAPE VOLUMES USING DATA PAGE ATOMIC UNITS

(75) Inventors: Steven Halladay, Superior, CO (US); David Allen Major, Broomfield, CO (US); Robert B. Wood, Niwot, CO (US)

(73) Assignee: Storage Technology Corporation, Louisville, CO (US)

( * ) Notice: Subject to any disclaimer, the term of this patent is extended or adjusted under 35 U.S.C. 154(b) by 573 days.

(21) Appl. No.: 09/426,516

(22) Filed: Oct. 26, 1999

(51) Int. Cl.$^7$ ............................................. G06F 12/00
(52) U.S. Cl. ........................... 711/170; 711/4; 711/173; 711/202; 711/206
(58) Field of Search .............................. 711/171, 170, 711/172, 173, 4, 202, 206, 208

(56) References Cited

U.S. PATENT DOCUMENTS

| | | | |
|---|---|---|---|
| 4,467,421 A | | 8/1984 | White |
| 5,546,557 A | * | 8/1996 | Allen et al. ................. 711/111 |

FOREIGN PATENT DOCUMENTS

WO      99 03098      1/1999

OTHER PUBLICATIONS

Memory Systems, Electrical Engineering Handbook, CRC Press, Inc., 1993, pp. 1927–1937.

* cited by examiner

Primary Examiner—Mano Padmanabhan
Assistant Examiner—Jasmine Song
(74) Attorney, Agent, or Firm—Brooks Kushman P.C.

(57) ABSTRACT

An intelligent data storage manager is operational in a virtual data storage system that uses a storage element to store data for a host processor. The storage manager includes a host interface and a controller. The host interface receives a virtual volume having virtual blocks from a host processor. The controller sequentially segments the virtual volume into data pages. Each data page includes virtual blocks of the virtual volume. The controller generates a meta data page associated with the virtual volume to map the data pages to the virtual blocks of the virtual volume. The controller uses the meta data page to selectively store the data pages onto the storage element. The storage element has a partitioning configuration and the amount of the virtual blocks included by each data page is a function of the partitioning configuration of the storage element. The meta data page associated with the virtual volume includes meta data page records. Each meta data page record includes meta data records and each of the meta data records corresponds to at least one virtual block. The storage element includes high and low performance storage elements. The controller uses the meta data page to recall selected data pages from the low performance storage element onto the high performance storage element. The controller uses the meta data page to migrate selected data pages from the high performance storage element onto the low performance storage element.

11 Claims, 3 Drawing Sheets

| Description | Bits | Format | Data Type | Size |
|---|---|---|---|---|
| 62 — Version Number | | "1.00" | Character String | 4 bytes |
| 64 — Date Created | | "mm/dd/yyyy" | Character String | 10 bytes |
| 66 — Time Created | | "hh:mm:ss" | Character String | 8 bytes |
| 68 — Device Emulated | 31<br>30 - 16<br>15<br>14 - 0 | DLT7000<br>Reserved for future devices<br>SCSI-2<br>Reserved for future channel types | | |
| 70 — Media Emulated | 6 - 0<br><br>7 | DLT7000<br>85    Type IV Media<br>Cartridge Write Protection<br>0    Read/Write Access<br>1    Read Only Access | Byte | 1 byte |
| 72 — Media Emulated | 7 - 0 | DLT7000<br>1B    35 GB without compression<br>82    20 GB without compression<br>83    40 GB with compression<br>84    35 GB without compression<br>85    70 GB with compression | Byte | 1 byte |
| 74 — File Length | 31 - 0 | Length of this Meta Data Page Table in bytes | Integer | 4 bytes |

*Fig. 4*

| Description | Bits | Format | Data Type | Size |
|---|---|---|---|---|
| 82 — Offset | 31 - 0 | Absolute location of initial block in a data page | Integer | 4 bytes |
| 84 — Tape remaining | 63 - 0 | Actual byte count of virtual tape remaining | Long Integer | 8 bytes |
| 86 — Consecutive Block Counter | 31 - 0 | Consecutive virtual tape blocks or filemarks | Integer | 4 bytes |
| 88 — Data Block Size | 31 - 0 | Virtual tape block size | Integer | 4 bytes |
| 90 — Data Page Number | 31<br><br>30 - 0 | 0    Data Compression On<br>1    Data Compression OFF<br>Number  0    Filemark<br>              1 - a  Data Page Number | Integer | 4 bytes |

*Fig. 5*

MANAGEMENT OF VIRTUAL TAPE VOLUMES USING DATA PAGE ATOMIC UNITS

TECHNICAL FIELD

The present invention relates generally to data storage systems and, more particularly, to an intelligent data storage manager for a virtual data storage system configured to segment virtual tape volumes into atomic units called data pages.

BACKGROUND ART

In a virtual data storage system, significant challenges lie in the management of virtual tape volumes written to an intelligent data storage manager from client applications across a storage network. Some of these challenges lie in the areas of access performance and cost of storage. To address these challenges, intelligent data storage managers may rely on some form of hierarchical storage management to shuttle virtual tape volumes, or portions thereof, to different logical and physical devices, depending on storage management attributes and storage management policy.

Other challenges lie in system performance, such as system bandwidth. Virtual tape volumes are often staged on a disk subsystem, which is used as a tape buffer. There often exists a speed mismatch between the input channel and the disk subsystem. Indeed, optimization of sequential write access to the disk subsystem is crucial to overall system performance. Likewise, as virtual tape volumes are written to the back end, i.e., the tape subsystem, speed matching is also desired.

Other challenges lie in large files. A virtual tape volume written by a tape backup application to an intelligent data storage manager may be very large. With a finite sized disk subsystem, an insufficient amount of concurrent virtual tape volume access is possible, unless the unit of storage management is less than a virtual tape volume in size.

To address these challenges, what is needed is an intelligent data storage manager for a virtual data storage system which divides virtual tape volumes into smaller storage units and then manages the storage of these smaller storage units in the virtual data storage system.

SUMMARY OF THE INVENTION

Accordingly, it is an object of the present invention to provide an intelligent data storage manager which segments virtual tape volumes into atomic units called data pages optimally sized for storage device performance in a virtual data storage system.

It is another object of the present invention to provide an intelligent data storage manager which selectively stores data pages making up a virtual tape volume on different storage devices in a virtual data storage system.

It is a further object of the present invention to provide an intelligent data storage manager which segments virtual tape volumes into data pages, selectively stores the data pages on different storage devices, and creates a meta data page to map the virtual tape volume blocks to associated data pages.

In carrying out the above objects and other objects, the present invention provides an intelligent data storage manager operational in a virtual data storage system that uses at least one data storage element to store data thereon for at least one host processor connected to the virtual data storage system. The intelligent data storage manager includes a host interface and a controller. The host interface receives a virtual volume having a plurality of virtual blocks from a host processor. The controller sequentially segments the virtual volume into data pages. Each data page includes at least one virtual block of the virtual volume. The controller generates a meta data page associated with the virtual volume to map the data pages to the respective virtual blocks of the virtual volume.

Preferably, the controller uses the meta data page to selectively store the data pages onto the at least one data storage element. Each of the at least one data storage element has a partitioning configuration and the amount of the at least one virtual block included by each data page is a function of the partitioning configuration of each of the at least one data storage element. Each data page preferably includes an identical amount of virtual blocks.

Preferably, the virtual volume is a virtual tape volume and the virtual block is a virtual tape block. The meta data page associated with the virtual volume includes a plurality of meta data page records. Each meta data page record includes a plurality of meta data records and each of the meta data records corresponds to at least one virtual block.

In a preferred embodiment, the at least one data storage element includes at least one high performance data storage element and at least one low performance data storage element. The controller uses the meta data page to recall selected data pages from the at least one low performance data storage element onto the at least one high performance data storage element. The controller also uses the meta data page to migrate selected data pages from the at least one high performance data storage element onto the at least one low performance data storage element.

In an alternative embodiment, the at least one data storage element includes a plurality of data storage elements of varying performance. The controller uses the meta data page to selectively store the data pages onto the at least one data storage element.

Further, in accordance with the above objects and other objects, the present invention provides a method of operating the intelligent data storage manager.

The above objects and other objects, features, and advantages of the present invention are readily apparent from the following detailed description of the best mode for carrying out the present invention when taken in connection with the accompanying drawings.

BRIEF DESCRIPTION OF THE DRAWINGS

FIG. 4 illustrates a meta data header record; and

FIG. 5 illustrates a meta data record.

BEST MODES FOR CARRYING OUT THE INVENTION

In general, the present invention is intended to receive and return arbitrary blocks of data from any host capable of small computer system interface (SCSI) data exchange, and manage pages of those data blocks intelligently and transparently to the data owners or hosts without additional hardware or software requirements of those hosts. The present invention provides for multiple, concurrent presentations, including file system presentations, virtual disk presentations, and the like.

Figure 1:
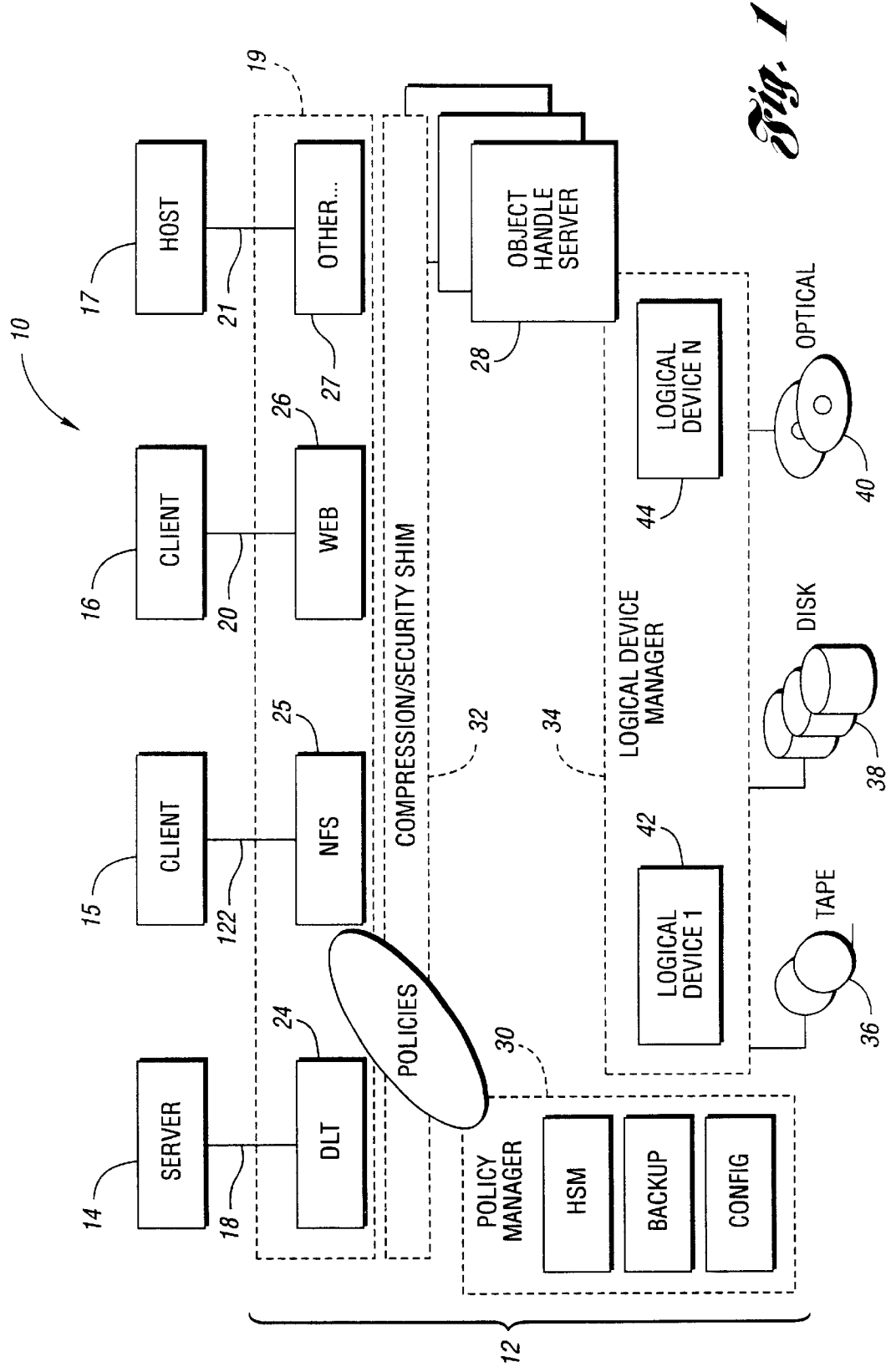
FIG. 1 illustrates in block diagram the overall architecture of a virtual data storage system in which the present intelligent data storage manager is implemented.

FIG. 1 illustrates in block diagram form the overall architecture of a virtual data storage system 10 in which the present intelligent data storage manager 12 is implemented. Virtual data storage system 10 is connected to a plurality of host processors 14–17 by means of respective data channels 18, 122, 20–21. Data channels 18, 122, 20–21 terminate in a host interface 19 which provides a layer of name servers 24–27 to present virtual implementations of existing defined physical device interfaces to host processors 14–17. As far as host processors 14–17 are concerned, name servers 24–27 implement a real physical device. Name servers 24–27 convert the user data received from host processors 14–17 into a user data object which can be either converted into a canonical format or left in binary format.

An object handle server 28 maps the object handle to logical device addresses and allows multiple instances of a data object. Object handle server 28 maps the user data object into a data space for storage. The mapping is determined by the policies programmed into policy manager 30 and subject to a security layer 32. The persistent storage for the object space is determined by a logical device manager 34 which allocates or creates a logical device based upon policies for storing the user data object.

A logical data storage device is a composite device and can consist of a real physical data storage device such as a magnetic tape subsystem 36, a magnetic disk subsystem 38, an optical disk subsystem 40, another logical device, such as Logical Device 1 which comprises a RAID 5 disk array 42, and Logical Device N which comprises software 44 that accesses another logical device, such as access of a logical device over a network connection, or combinations of the above. The logical device definition abstracts the nature of the real device associated with the persistent storage.

In operation, host interface 19 receives a virtual tape volume from one of host processors 14–17. The virtual tape volume includes a plurality of virtual tape blocks. Each virtual tape block has a variable size. As an example, each virtual tape block is on the order of 32 kilobytes in size.

Respective name server 24–27 sequentially segments the virtual tape volume into atomic units called data pages. Each data page includes at least one virtual tape block. Name servers 24–27 control the storage of the virtual tape volume to the data storage devices by controlling the storage of the data pages to the data storage devices. Name servers 24–27 control the storage of the data pages to the data storage devices to enhance the input/output between host processors 14–17 and the data storage devices.

Each data page has a constant size. As an example, each data page is on the order of 64 megabytes in size and includes two hundred 32 kilobyte sized virtual tape blocks. The size of each data page is a function of the configuration of the data storage elements such as tape subsystem 36 and disk subsystem 38. For example, if intelligent data storage manager 12 uses magnetic tape subsystems as tertiary storage, where those tape subsystems take advantage of a partitioning scheme such that each partition is 64 megabytes in size, then having data pages also of 64 megabytes realizes specific advantages related to space reclamation on tape. Specifically, Insert Edits are now enabled, there is no need for ordering data pages on tape in order of expiry, or for space reclamation operations.

As virtual tape volumes are being written to intelligent data storage manager 12, the data stream making up the virtual tape volumes are sequentially segregated by name servers 24–27 into data pages. Each data page includes multiple virtual tape blocks and each virtual tape volume includes multiple data pages. Name servers 24–27 map incoming virtual tape blocks to data pages and map outgoing virtual tape blocks from the data pages.

A data page is the unit of transfer between name servers 24–27 and tape subsystem 36 and disk subsystem 38. Tape subsystem 36 is considered a low performance device in that it has a relatively low cost and is relatively slow when compared to disk subsystem 38. Disk subsystem 38 is considered a high performance device in that it has a relatively high cost and is relatively fast when compared to tape subsystem 36.

After segmenting the virtual tape volume into data pages, respective name server 24–27, in conjunction with object handle server 28 and policy manager 30, controls flow of the data pages onto disk subsystem 38 from host interface 19. Respective name server 24–27, again in conjunction with object handle server 28 and policy manager 30, particularly, the HSM component of the policy manager, then controls the migration of selected data pages from disk subsystem 38 to tape subsystem 36. Data pages are selected for migration from disk subsystem 38 to tape subsystem 36 based on a least recently used algorithm (LRU), a size-weighted (LRU) algorithm, and the like.

Other virtual tape volume or client attributes, such as set through a policy interface, can influence migration. For instance, in a file system presentation, policy may indicate that certain data pages need permanently reside on high performance storage. Similarly, data pages may reside in multiple locations simultaneously, to effect high data reliability, data sharing, and disaster recovery capability. There is no guarantee that the collection of data pages of a virtual tape volume will migrate to the same physical tape cartridge or multi-volume cartridge in tape subsystem 36. Application of virtual tape volume or client level affinity/dis-affinity policy influences migration and multi-volume cartridge space reclamation algorithms.

Selected data pages of a virtual tape volume are located on disk subsystem 38. These data pages are considered to be "open" and reserved by the client application for reading and writing. Other data pages of the virtual tape volume are located on tape subsystem 36 after migrating from disk subsystem 38. The data pages residing on tape subsystem 36 are available for recall onto disk subsystem 38 as the client application requests. Name servers 24–27, in conjunction with object handle server 28 and policy manager 30, employ intelligence to pre-fetch data pages of a virtual tape volume in a timely fashion such that disk subsystem 38 is optimally used, i.e., the client application enjoys disk subsystem data recall performance, whilst the majority of the data pages of the virtual tape volume resides elsewhere in the storage hierarchy.

Figure 2:
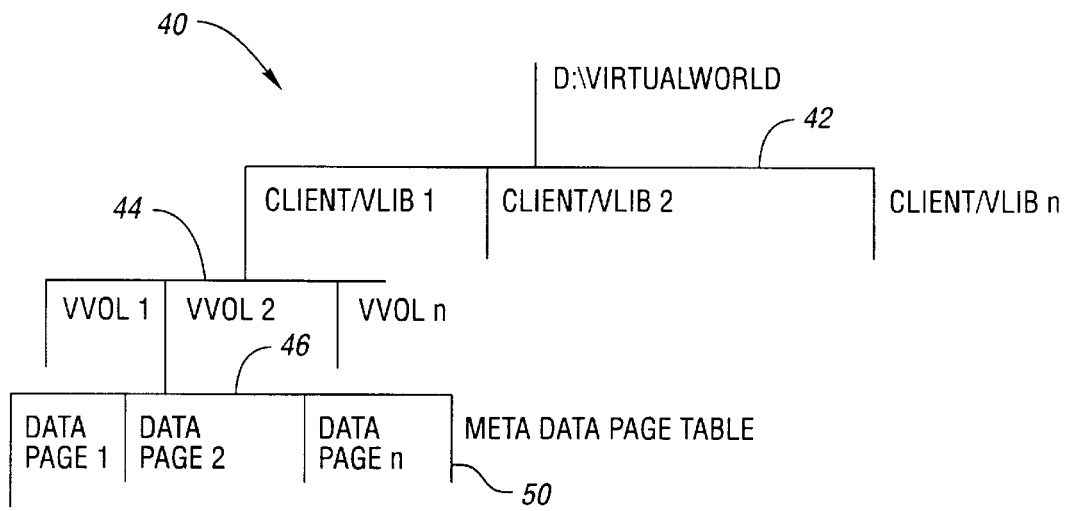
FIG. 2 illustrates an organizational tree describing the organization of data pages of virtual tape volumes for different client applications.

Referring now to FIGS. 2–5, with continual reference to FIG. 1, name servers 24–27 generate a meta data page to map the data pages to the virtual tape blocks of the virtual tape volume. FIG. 2 illustrates a tree structure 40 showing the organization of the data pages in a virtual tape volume. Object handle server 28 is essentially the hierarchical file system representation shown by tree structure 40. Tree structure 40 is divided on a first level into different client directories 42. Each client directory 42 is divided into different virtual tape volumes 44. Each virtual tape volume 44 is divided into data pages 46 and has an associated meta data page table 50.

Figure 3:
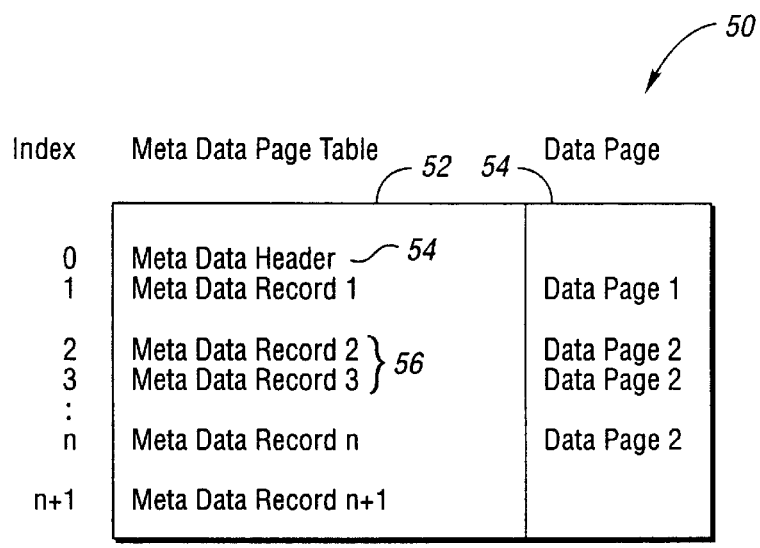
FIG. 3 illustrates a meta data page table.

FIG. 3 illustrates a meta data page table 50 having a meta data page record column 52 and a corresponding data page column 54. Each meta data page for a virtual tape volume consists of a meta data header 54 and a plurality of data records 56. Each data record 56 corresponds to a respective set of virtual tape blocks making up a data page. For instance, data record 1 corresponds to virtual tape block set 1 as shown in FIG. 3. Data records 56 correspond to data pages of the virtual tape volume. For example, data record 1 corresponds to data page 1 and data records 2 through n correspond to data page 2.

Data record n+1 is a file mark and has no corresponding data page. Data record 1 includes constant sized virtual tape blocks. Data records 2 through n include an aggregation of variable sized virtual tape blocks. Data records 2 through n correspond to virtual tape block sets 2 through n.

Generally, the controller uses the meta data page to selectively store the data pages onto the storage elements operable with intelligent data storage manager 12. In a storage element configuration having high performance disk subsystem 38 and low performance tape subsystem 36, the controller uses the meta data page to migrate selected data pages from disk subsystem 38 onto tape subsystem 36. Similarly, the controller uses the meta data page to recall selected data pages of the virtual tape volume from tape subsystem 36 onto disk subsystem 38.

FIG. 4 illustrates information contained by a meta data header record 60. Meta data header record 60 generally includes control information specific to the presentation of intelligent data storage manager 12 to the client application. Meta data header record 60 may also include ancillary information such as write protection status. As shown in FIG. 4, meta data header record 60 for a virtual tape volume includes version number information 62, date and time created information 64 and 66, device type information 68, media type information 70, media density information 72, and file length information 74. Media type information 70 describes the type of media that the data pages of the virtual tape volume can be written onto and the type of read/write access of the data pages. File length information 74 describes the length of the meta data page.

FIG. 5 illustrates a meta data record 80. Meta data record 80 generally includes information specific to a data record. As shown in FIG. 5, meta data record 80 includes offset information 82, tape remaining information 84, consecutive block counter information 86, data block size information 88, and data page number information 90. Consecutive block counter information 86 and data block size information 88 enable the location of a particular virtual tape block within a data page to be determined.

As noted, virtual tape blocks may be of variable size. Consecutive blocks of constant size are organized in one meta data record (hence consecutive block counter information 86 and data block size information 88), up to the limits of data page size imposed by the controller. If all blocks have a constant size, then there will be one meta data record per data page. In the worst case of variable block size, i.e., no consecutive blocks of constant size, there will be one meta data record for each block. As pointed out above, some meta data records will have no corresponding data page, specifically those that record file marks.

Options exist to retain certain data pages on disk subsystem 38 including data pages that contain application specific header or trailer information. This assures that virtual tape volume mount verify operations succeed without requiring a recall of client specific information from the low latency tape subsystem 36.

As described above, intelligent data storage manager 12 uses data pages for input/output between client host processors 14–17 and the data storage elements. Data pages may also be used for control flow. For instance, data page boundaries may be used to regulate client consumption of intelligent data storage manager 12 under high load conditions, where the clients are competing for system resources. That is, a first client is allowed to complete one data page of input/output then the process of the first client is put on hold while a second client completes one data page of input/output. This is analogous to multi-threading algorithms, and would be employed to prevent any one client application from failing due to a timeout waiting for input/output.

Preferably, high and low performance data storage elements are associated with intelligent data storage manager 12. Alternatively, intelligent data storage manager 12 is associated with one storage device or a set of storage devices having the same performance qualities. For example, only data storage devices in the form of tape devices may be associated with intelligent data storage manager 12. In this case, virtual tape volumes are parsed into data pages (in this case, 256 kilobytes in size) and multiplexed with other data pages onto a single real tape volume. In this case, the 256 kilobyte size of the data page was selected to increase primary memory buffer performance. Alternatively, intelligent data storage manager 12 may be associated with a data storage configuration having three or more levels of storage performance or hierarchy.

Virtual tape is but one representation of intelligent data storage manager 12, and that the description about the tape block to data page associations becomes less relevant when considering alternate presentations. If clients are using intelligent data storage manager 12 to satisfy network file system or web services, data pages are now best related to "extents" (a collection of blocks) associated with one or more files.

Thus it is apparent that there has been provided, in accordance with the present invention, an intelligent data storage manager for a virtual data storage system the fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An intelligent data storage manager operational in a virtual data storage system that uses a plurality of high and low performance data storage elements to store data thereon for at least one host processor connected to the virtual data storage system, the intelligent data storage manager comprising:

a host interface for receiving a virtual tape volume having a plurality of virtual tape blocks from a host processor; and a controller for sequentially segmenting the virtual tape volume into data pages, wherein each data page includes at least one virtual tape block of the virtual tape volume, wherein the controller generates a meta data page associated with the virtual tape volume to map the data pages to the respective virtual tape blocks of the virtual tape volume, wherein the controller uses the meta data page to selectively store the data pages onto the high and low performance data storage elements;

wherein each of the high and low performance data storage elements has a partitioning configuration, wherein the amount of the at least one virtual tape block included by each data page is a function of the partitioning configuration of at least one of the high and low performance data storage elements.

2. The intelligent data storage manager of claim 1 wherein:

each data page includes an identical amount of data.

3. The intelligent data storage manager of claim 1 wherein:

the meta data page associated with the virtual tape volume includes a plurality of meta data page records, each meta data page record including a plurality of meta data records, each of the meta data records corresponding to at least one virtual tape block.

4. The intelligent data storage manager of claim 1 wherein:

the controller uses the meta data page to recall selected data pages from the at least one low performance data storage element onto the at least one high performance data storage element.

5. The intelligent data storage manager of claim 1 wherein:

the controller uses the meta data page to migrate selected data pages from the at least one high performance data storage element onto the at least one low performance data storage element.

6. A method of operating an intelligent data storage manager operational in a virtual data storage system that uses at least one data storage element to store data thereon for at least one host processor connected to the virtual data storage system, the method comprising:

receiving a virtual tape volume having a plurality of virtual tape blocks from a host processor;

sequentially segmenting the virtual tape volume into data pages, wherein each data page includes at least one virtual tape block of the virtual tape volume;

generating a meta data page associated with the virtual tape volume to map the data pages to the respective virtual tape blocks of the virtual tape volume;

using the meta data page to selectively store the data pages onto the at least one data storage element;

wherein each of the at least one data storage element has a partitioning configuration, wherein the amount of the at least one virtual tape block included by each data page is a function of the partitioning configuration of at least one data storage element.

7. The method of claim 6 wherein:

each data page includes an identical amount of data.

8. The method of claim 6 wherein:

the meta data page associated with the virtual tape volume includes a plurality of meta data page records, each meta data page record including a plurality of meta data records, each of the meta data records corresponding to at least one virtual tape block.

9. The method of claim 6 wherein:

the at least one data storage element includes at least one high performance data storage element and at least one low performance data storage element, wherein the method further includes using the meta data page to recall selected data pages from the at least one low performance data storage element onto the at least one high performance data storage element.

10. The method of claim 6 wherein:

the at least one data storage element includes at least one high performance data storage element and at least one low performance data storage element, wherein the method further includes using the meta data page to migrate selected data pages from the at least one high performance data storage element onto the at least one low performance data storage element.

11. The method of claim 6 wherein:

the at least one data storage element includes a plurality of data storage elements of varying performance.

* * * * *